March 3, 1942. M. HEIM 2,274,691

MOLD FOR SHAPING GLASS BULBS

Filed July 20, 1940

Inventor:
M. HEIM
BY C.G. Sprague
ATTORNEY

Patented Mar. 3, 1942

2,274,691

UNITED STATES PATENT OFFICE 2,274,691

MOLD FOR SHAPING GLASS BULBS

Max Heim, Berlin-Lankwitz, Germany, assignor to Fernseh G. m. b. H., Berlin-Zehlendorf, Germany Application July 20, 1940, Serial No. 346,545
In Germany April 1, 1939

3 Claims. (Cl. 49—69)

My invention relates to a form or mold for shaping the glass bulb or flask of cathode ray tubes. It refers particularly to the manufacture of bulbs having a square or rectangular bottom.

The glass vessel of cathode ray tubes consists usually of a cylindrical portion and a conical portion. The cylindrical neck of the tube contains the means for supporting the leads and the electron gun system including cathode, anode and deflecting system. The conical portion is connected with its narrow part to the cylindrical portion and carries at its wide end the screen of the tube. The bulb is usually blown in a mold of wood or metal.

It is an object of the invention to provide a mold by means of which the bottom of the tube having usually the form of a curved glass wall can be made in such a manner that it has uniform thickness and is free from irregularities of the surface and from flaws.

The bulb of cathode ray tubes as hitherto used has mostly a curved circular bottom. Such bulbs can be manufactured in a simple process. A mold is used which can be opened for removing the finished glass vessel. A charge of glass in a plastic state is introduced by means of the blow pipe into the form. The glass-blower begins his operation continuously rotating the pipe in different directions. The glass which expands under the influence of the air blown into the pipe touches gradually the wall of the form. The glass is therefore shaped by the walls of the form and the outer surface of the bulb becomes smooth by the continuous motion. After sufficient time the blower stops his work and the glass body is allowed to cool within the form. The form is then opened and the glass body is removed. The walls of the vessel have a polished and highly reflecting surface.

In certain cases it is desirable to use cathode ray tubes with a square bulb portion and a rectangular bottom. The glass bulb can in this case not be made in the manner described above because the glass body cannot be rotated within the form. Bulbs of this type have therefore been blown without rotation. The bottom of such bulbs contains numerous irregularities which must be avoided if the image on the bottom of the tube is to be free from distortions.

This difficulty cannot be avoided by polishing the inner walls of the mold because even with a polished mold surface the glass body does not become sufficiently even. If therefore a completely smooth surface free from any faults shall be produced the above mentioned methods cannot be used.

According to the invention the mold is so constructed that the section of the mold producing the bottom of the tube can be rotated while the remaining part of the mold which is used for shaping the conical portion of the tube and the neck portion is stationary.

Other aspects of my invention will be apparent or will be specifically pointed out in the description forming a part of this specification, but I do not limit myself to the embodiment of the invention herein described, as various forms may be adopted within the scope of the claims.

Referring to the drawing

Figure 1:
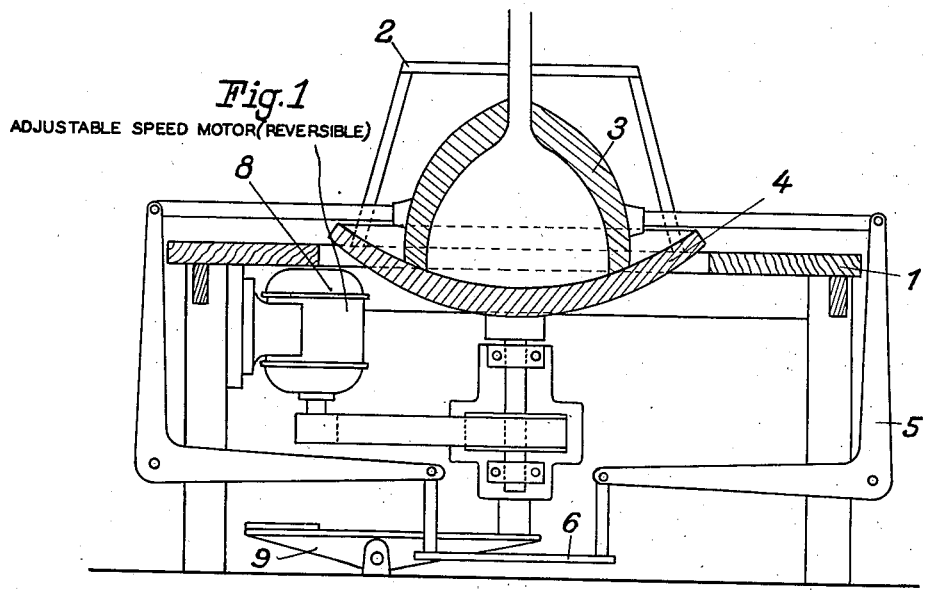
Fig. 1 shows a vertical cross section through the mold.
Figure 2:
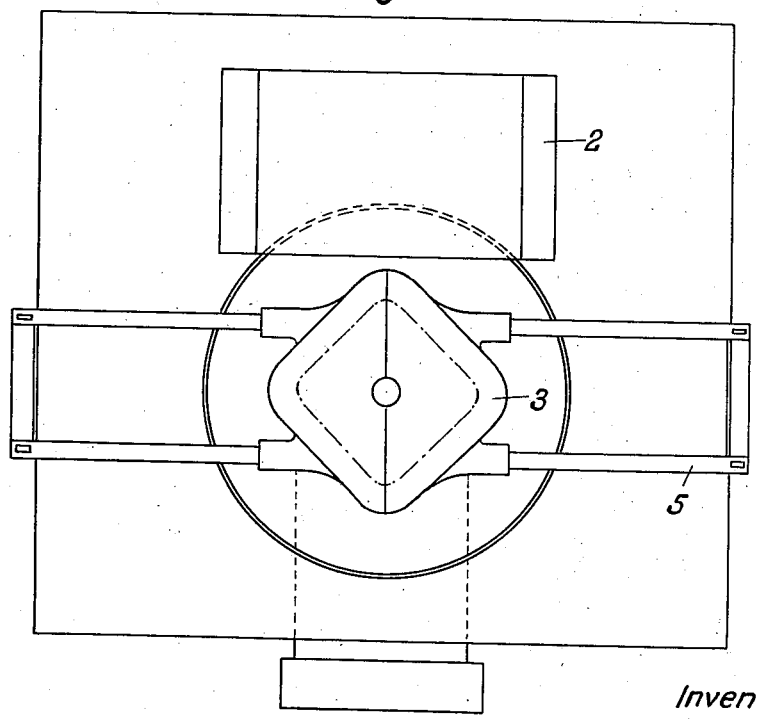
Fig. 2 is a plane view of the mold of Fig. 1.

A work bench 1 has in its central part an opening and at one side thereof a shelf 2 for the glass-blower. The mold is situated in front of the shelf. It consists of two stationary sections 3 and a rotatable section 4. The sections 3 have the shape of the conical bulb portion and can be shifted toward and away from the work piece. Each section 3 has an inner surface corresponding to the outer form of the glass bulb. The sections 3 are connected by way of pivoted levers 5 with operating handles or treadle plates 6. By operating the treadle plates 6 the sections 3 can be moved outwardly or inwardly. When the mold is closed the sections are pressed against each other so that no glass can escape and the inner surface of the form does not show depressions or extensions. The inner surfaces of sections 3 are so constructed that they fit against the bottom section of the mold.

The bottom section 4 consists of a hollow curved plate representing in its central part the surface of the bottom of the tube; the outer edges may be horizontal. The section 4 is rotated by a motor 8 and supported by a device for raising and lowering the section. A treadle plate 9 is used for moving the section in vertical direction. In its uppermost position the section 4 is lying against the sections 3 so that the mold is closed from all sides.

The operation of the device is as follows: The glass-blower introduces the blow pipe with a charge of glass into the upper opening of the closed mold. The bottom section 4 is tightly pressed against the sections 3. The bottom plate 4 is rotated by a motor 8 while the glass-blower begins his operation. The glass-blower need not rotate the pipe because the bottom of the form is rotated mechanically. In the beginning of the operation the glass-blower may rotate the pipe additionally.

The glass bulb expands by the air blown into it and touches the wall of the mold. The bottom is polished by the continuous motion of the section 4 so that after a certain time all irregularities of the bottom of the bulb are removed and the bottom is absolutely smooth. The blower stops his operation and the mold together with the glass is allowed to cool. The mold is openend by operating the treadle plates 6 and 9 and the glass body is removed. During the operation there is an amount of friction between the stationary sections 3 and the rotatable section 4. In order to decrease the friction the sections 3 may be resiliently supported. They may also have ball bearings taking up the pressure of the bottom section 4. The lateral parts of the mold are provided with guide members consisting, for example, of guiding rods 5 so that the mold sections are moved easily and exactly during the opening and closing operation.

In another embodiment the sections 3 are replaced by a single mold section which cannot be opened sideways. For taking out the glass bulb the rotatable bottom section 4 is lowered so far that the bulb can be removed out of the mold in downward direction. The upper part of the mold may also be mounted in a bearing, having its axis of rotation in the center of the spherical surface of plate 4. The upper part of the mold is then turned sideways so that the finished glass bulb can be withdrawn.

There is always the danger that by rotating the bottom section exclusively in one and the same direction the plastic glass is shifted into the corners of the mold. This can be avoided by changing regularly the direction and/or speed of rotation.

The invention is not limited to the above described embodiments. It relates to all forms of tube bulbs with angular bottom surface. It can particularly be used for manufacturing bulbs with a flat surface. In this case the bottom section 4 has a substantially plane inner surface.

What I claim is:

1. A mold for use in forming from hot plastic material by a blowing process a cathode ray tube having a generally flaring side wall portion terminating in an end portion which is convex outwardly and with portions of the side walls contiguous to the end portion differently spaced from the center of the end portion, said mold comprising a first portion having a flaring interior surface of the shape desired for the side walls of the tube, whereby its periphery at the large end thereof is non-circular, and a rotatable second portion having a concave surface, means for moving said second mold portion in the direction of the longitudinal axis of said first mold portion to place said concave surface either in engagement with said first mold portion at the non-circular periphery thereof, or out of engagement therewith to close and open the mold, means for holding said first mold portion stationary during the process of blowing said tube within said mold, and means for rotating during the blowing process said second mold portion while said two portions are in contact, to simultaneously shape, smooth and polish the end wall of said tube, said concave surface being of such shape and extent that all parts of said non-circular periphery remain in contact therewith while said second mold portion is rotating.

2. A mold for use in forming from hot plastic material by a blowing process a cathode ray tube having a generally flaring side wall portion terminating in an end portion which is convex outwardly and with portions of the side walls contiguous to the end portion differently spaced from the center of the end portion, said mold comprising a first portion having a flaring interior surface of the shape desired for the side walls of the tube, whereby its periphery at the large end thereof is non-circular, and a rotatable second portion having a concave surface, means for moving said second mold portion in the direction of the longitudinal axis of said first mold portion to place said concave surface either in engagement with said first mold portion at the non-circular periphery thereof, or out of engagement therewith to close and open the mold, means for holding said first mold portion stationary during the process of blowing said tube within said mold, and means for rotating during the blowing process said second mold portion while said two portions are in contact, to simultaneously shape, smooth and polish the end wall of said tube, said concave surface being of such shape and extent that all parts of said non-circular periphery remain in contact therewith while said second mold portion is rotating, said means for rotating said second mold portion including means for reversing the direction of rotation to reduce the tendency towards uneven distribution of the hot plastic caused by the non-circular shape of the periphery of the interior surface of the first mold portion adjacent the second mold portion.

3. A mold for use in forming from hot plastic material by a blowing process a cathode ray tube having a generally flaring side wall portion terminating in an end portion which is convex outwardly and with portions of the side walls contiguous to the end portion differently spaced from the center of the end portion, said mold comprising a first portion having a flaring interior surface of the shape desired for the side walls of the tube, whereby its periphery at the large end thereof is non-circular, and a rotatable second portion having a concave surface, means for moving said second mold portion in the direction of the longitudinal axis of said first mold portion to place said concave surface either in engagement with said first mold portion at the non-circular periphery thereof, or out of engagement therewith to close and open the mold, means for holding said first mold portion stationary during the process of blowing said tube within said mold, and means for rotating during the blowing process said second mold portion while said two portions are in contact, to simultaneously shape, smooth and polish the end wall of said tube, said concave surface being of such shape and extent that all parts of said non-circular periphery remain in contact therewith while said second mold portion is rotating, said means for rotating the second mold portion including means for varying the speed of rotation to reduce the tendency toward unequal distribution of the hot plastic material caused by the non-circular unsymmetrical shape of the periphery of the interior surface of said first mold portion adjacent the second mold portion.

MAX HEIM.